F. J. FENSTERMACHER.

BRACE FORMER.

APPLICATION FILED DEC. 19, 1913.

Reissued Feb. 15, 1916.

14,065.

2 SHEETS—SHEET 1.

Witnesses:

D. D. Lancer

Arthur K. Randall

Inventor:

Franklin J. Fenstermacher, by Clyde R. Rogers his Atty.

THE COLUMBIA PLANOGRAPH CO., WASHINGTON, D. C.

F. J. FENSTERMACHER.
BRACE FORMER.
APPLICATION FILED DEC. 19, 1913.
Reissued Feb. 15, 1916.
14,065.
2 SHEETS—SHEET 2.
Fig. 5.
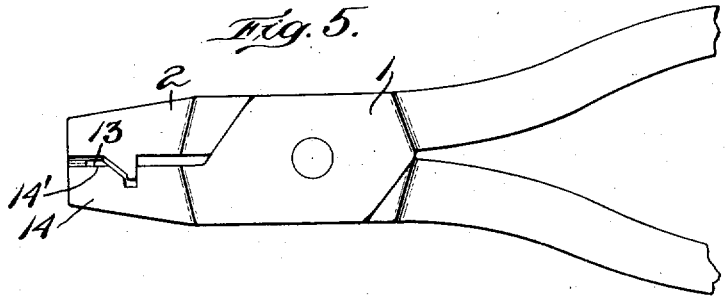
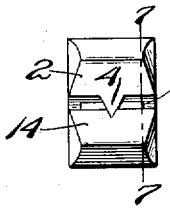
Fig. 6.
Fig. 8.
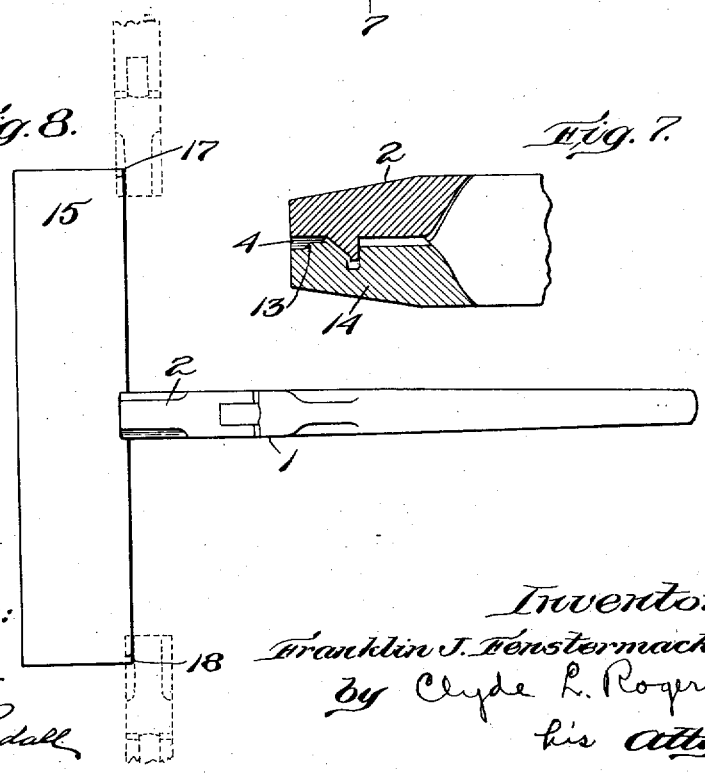
Fig. 7.
Witnesses:
J. J. Lanker
Arthur T. Randall
Inventor:
Franklin J. Fenstermacher,
by Clyde R. Rogers
his Atty.
THE COLUMBIA PLANOGRAPH CO., WASHINGTON, D. C.

UNITED STATES PATENT OFFICE.

FRANKLIN J. FENSTERMACHER, OF NEW YORK, N. Y., ASSIGNOR TO SOUTHWORTH MACHINE COMPANY, OF PORTLAND, MAINE, A CORPORATION OF MAINE.

BRACE-FORMER.

14,065. Specification of Reissued Letters Patent. Reissued Feb. 15, 1916.

Original No. 1,054,964, dated March 4, 1913, Serial No. 610,114. Application for reissue filed December 19, 1913. Serial No. 807,797.

*To all whom it may concern:*

Be it known that I, FRANKLIN JACOB FENSTERMACHER, a citizen of the United States, residing at New York, in the county of New York and State of New York, have invented certain new and useful Improvements in Brace-Formers, of which the following is a specification.

This invention relates to improvements in printers' equipment and the principal object of the invention is to provide a device by means of which an ordinary brass printer's rule may be quickly and easily changed to a brace; this being accomplished by bending or crimping one edge of the rule at an intermediate point and at its ends by the action of forming or die members between which the edge of the rule is engaged. For attaining this object I provide a pair of forming or die elements mounted for movement with respect to each other so as to come together for pressing and forming the rule edge between them.

One important feature of invention has to do with a novel and combined arrangement of the provision for bending the edge of the rule ends in conjunction with the means for forming the intermediate bend, whereby the rule can be successively presented in the three positions required for these operations in the quickest and most convenient manner. For this purpose I arrange the means for forming the bends at the respective ends, at two opposite sides of the die elements with the means for forming the intermediate bend at a third side of the die elements and between the end bending means, so that different parts of the rule can be successively presented to the required positions with the greatest convenience, in the most natural and instinctive manner and with no unnecessary movements or manipulations.

The invention will be better understood from the following detailed description taken in connection with the accompanying drawings and will be thereafter pointed out in the appended claims.

Figure 1:
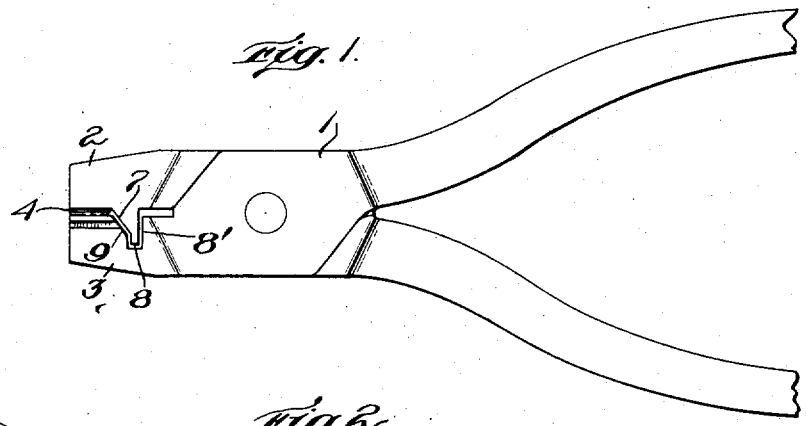
Figure 2:
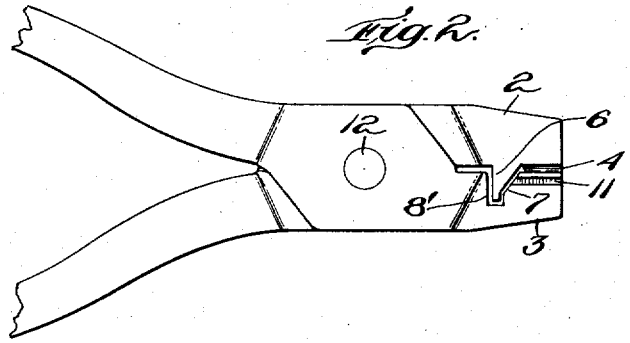
Figure 3:
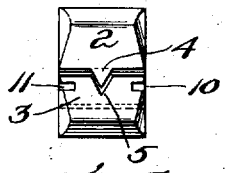
Figure 4:
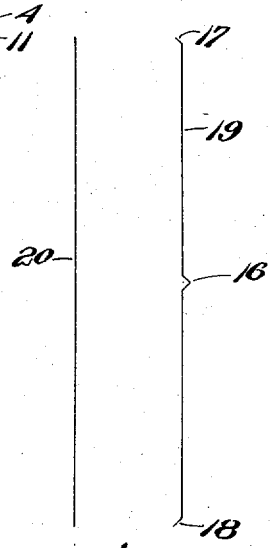

Referring to the drawings: Figure 1 is a side elevation of my improved brace former; Fig. 2 is a side elevation of the reverse side of the head thereof; Fig. 3 is an end view of the head; Fig. 4 shows an edge view of a rule, before and after being formed into a brace; Fig. 5 is a side elevation of a modified form of the invention; Fig. 6 is an end view of Fig. 5; Fig. 7 is a longitudinal sectional view through the head taken on line 7—7 of Fig. 6; and Fig. 8 is a plan of the device in operation to form a brace.

In the device of the present showing wherein for illustrative purposes I have shown my invention embodied in a plier form of tool, 1 indicates a pair of pliers having jaws 2 and 3 pivoted together at 12, these jaws constituting the forming or die shaping elements which are thus illustratively shown as having a relative swinging movement. The jaws or die shaping elements 2, 3 hereinafter termed dies, are provided centrally of their ends, the one with a lengthwise extending V-shaped projection 4 and the other with an opposite V-shaped recess 5, the projection 4 shown as being on the die 2 and the recess 5 as in the die 3, the mating faces of said dies at each side of said projection and recess being flat and parallel. The dies 2, 3 are also formed, the one with a transverse projection 6 and the other with a corresponding recess 8, the projection 6 being shown as on the die 2 and the recess 8 as in the die 3. It is to be observed that the projection 6 has its forward face 7 inclined with reference to the direction of jaw movement and the recess 8 has its front side formed with an inclined face 9 adapted to coöperate therewith, the inclined formation being shown as terminating somewhat short of the extremity of the projection and recess respectively.

In Figs. 1 to 3, I show the die which is formed with the transverse recess 8, *i. e.*, the die 3, as provided with lateral slots 10, 11 constituting open ended recesses which extend from the outer end of the die to the recess 8, these slots being of a width and depth to receive the edge of a rule to be treated. It will be observed that the transversely extending recess 8 has a rear wall 8′ adapted to serve as a stop or barrier for the ends of the rule as held in either recess 10 or 11 and extending across recess 8, the wall or back edge 8′ for this purpose being shown as vertical.

It may now be understood that when it is desired to transform a rule into a brace, the printing edge adjacent one end of the rule is inserted lengthwise in one of the lateral recesses at either side at random, say in the slot 10, and pressed in until the rule end comes against the stop 8′, then as the jaw dies are pressed together the crimp or bend is produced in the rule edge at this end by the action of the inclined faces 7 and 9. Thereupon the operative removing the rule turns it around one-quarter way and grips its intermediate portion transversely between the jaw ends producing the intermediate crimping or bend 16 in the edge as seen in Fig. 4. Then again releasing the rule it is turned another quarter way around and its other end engaged in the other lateral recess 11 and pushed in against the barrier 8′ so that the edge adjacent the other end may be crimped or bent in, in the same direction as the end first operated on. I consider this relative arrangement of parts of great value and importance for the reason that it brings into association and coöperative relation the means for crimping or bending in, in the same direction as required, the two ends of the rule, and producing the intermediate crimp in the most convenient and expeditious manner, the operative not being required to make a separate movement of the rule for crimping its intermediate portion at 16, but the transverse positioning for this operation being merely an intermediate point in the shifting movement required for crimping the one end of the rule after the other is finished.

In Figs. 5, 6 and 7 a modified form of the device is shown, wherein the side slots are eliminated. As here shown, I form one of the jaws or die elements 14 with a raised portion 13, rabbeted or cut away at its sides and front so as to permit insertion of the edge of the rule at each side and at the ends of the jaws to the required extent for operating on the rule edge to the proper depth, and thus serving as a gage or guide wall to determine the extent of the rule edge to be crimped. This rabbeted formation is indicated at 14′ and the raised portion 13 is shown as extending back so that it forms the top of the inclined forward wall of the transverse recess.

In Fig. 8 I show a rule 15 being operated on by my improved device to form a central crimp 16 in its edge, the crimps 17, 18 in its ends being formed in the manner already described. From an inspection of this view it will be observed that the three bends or crimps in question can be produced one after the other by a relative shift of the tool and rule continuously in the same direction with a minimum of manipulation, and further that this shifting adjustment is a relative one, *i. e.*, the rule may be conveniently swung around to the successive positions for presentation to the die shaping elements at different sides thereof, supposing these elements to be stationarily mounted. Thus it is to be noted that the dies or die shaping elements constituted by the jaws 2, 3 present means on each of three adjoining sides, for crimping action on the different parts of the rule edge, the ends of the jaws, being of course one of the sides when these are considered in their aspect as die elements. In the use of my invention it is possible to complete the making of a brace out of a printer's rule without letting go or shifting the grip on either pliers, or the rule piece being treated. While I consider the form of the invention shown, with the projection 4 on the jaw die 2, and the mating recess 5 in the jaw die 3, as most suitable for a hand tool, because lending itself to the most natural movement of the hands, it is to be understood that this is merely illustrative, and in no way restrictive, the essential being a mating projection and recess at a central portion of this side of the die elements without regard to whether one die or the other has the projection formed thereon; the same being true as to the transverse projection 6 and recess 8.

With the device described, a compositor can thus in a moment form a brace of any required length from ordinary rule stock and be sure of having the brace so formed accurate and perfect. While the device is herein shown as embodied in a plier tool, it is to be understood that this showing is illustrative and not restrictive and that I desire the elements 2, 3 to be considered in their aspect of die shaping members mounted in coactive relation whether on swinging jaws or not.

Having described my invention, what I claim as new and desire to secure by Letters Patent is:

1. Apparatus of the kind described, comprising a pair of dies mounted for co-active relative opening and closing movement, one of said dies being formed with a recess intersecting its body intermediate its ends and extending transversely thereof, the front edge of said recess sloping forwardly to form an inclined surface, said die being formed with lateral horizontal extending open-ended recesses communicating with said recess, the back edge of said recess being transverse of said lateral recesses and serving as a stop for metal disposed therein and bridging said first end recess, and a tongue on said other die taking into said transverse recess to shape such metal to the incline of its front edge.

2. Apparatus of the kind described, comprising a pair of dies mounted for co-active relative opening and closing movement, one of said dies being formed with a transverse recess across its face, the front edge of such recess sloping forwardly to form an inclined surface, said die being formed with a lateral horizontally extending open-ended recess communicating with said first named recess, the back edge of said first named recess being transverse of said open-ended recess and serving as a stop for metal disposed in said lateral recess and bridging said first named recess, and a tongue on said other die taking into said transverse recess to shape said metal to the incline of its front edge.

3. Apparatus of the kind described, comprising a pair of dies mounted for co-active relative opening and closing movement, one of said dies being formed with a transverse recess across its face, the front edge of said recess sloping forwardly to form an inclined surface, means at the sides of said die for receiving and guiding metal in strip form to extend across said recess, the back edge of said recess being transverse and serving as a stop for such metal, and a tongue on said other die taking into said transverse recess to shape said metal to the incline of its front edge.

4. A tool comprising two handles having a pivotal movement, a jaw formed on each handle, one of said jaws formed with a recess intersecting its body intermediate its ends and extending transversely thereof, the front edge of said recess sloping forwardly to form an inclined surface, lateral horizontally-extending open-ended recesses formed upon said jaw communicating with said recess, the back edge of said recess being vertical and serving as a stop for metal disposed in said lateral recesses and bridging said first-named recess, and a tongue on said other jaw taking into said transverse recess to shape said metal to the incline of its front edge.

In testimony whereof, I have signed my name to this specification, in the presence of two subscribing witnesses.

FRANKLIN J. FENSTERMACHER.

Witnesses:
HENRY DIETRICH,
FREDERIC DIETRICH.

Copies of this patent may be obtained for five cents each, by addressing the "Commissioner of Patents, Washington, D. C."